(12) United States Patent
Dinca et al.

(10) Patent No.: US 7,285,065 B2
(45) Date of Patent: Oct. 23, 2007

(54) BELT TENSIONER WITH INSTALLATION PIN

(75) Inventors: Flaviu Dinca, Richmond Hill (CA); Yinchu Tao, Woodbridge (CA); Rares I. Comsa, Oakville (CA)

(73) Assignee: Litens Automotive Partnership, Woodbridge, Ontario (CA)

(*) Notice: Subject to any disclaimer, the term of this patent is extended or adjusted under 35 U.S.C. 154(b) by 342 days.

(21) Appl. No.: 10/485,480

(22) PCT Filed: Jul. 31, 2002

(86) PCT No.: PCT/CA02/01201

§ 371 (c)(1),
(2), (4) Date: Jan. 30, 2004

(87) PCT Pub. No.: WO03/012317

PCT Pub. Date: Feb. 13, 2003

(65) Prior Publication Data

US 2004/0180745 A1    Sep. 16, 2004

Related U.S. Application Data

(60) Provisional application No. 60/308,612, filed on Jul. 31, 2001.

(51) Int. Cl.
*F16H 7/10* (2006.01)
(52) U.S. Cl. ...................... 474/112; 474/135
(58) Field of Classification Search ............... 474/112, 474/135, 133, 134, 136, 137, 138
See application file for complete search history.

(56) References Cited

U.S. PATENT DOCUMENTS

| | | | | |
|---|---|---|---|---|
| 4,473,362 A | * | 9/1984 | Thomey et al. | 474/135 |
| 4,832,665 A | | 5/1989 | Kadota et al. | |
| 4,923,435 A | * | 5/1990 | Kadota et al. | 474/112 |
| 5,244,438 A | * | 9/1993 | Golovatai-Schmidt | 474/112 |
| 5,266,067 A | * | 11/1993 | Gapco | 474/112 |

(Continued)

FOREIGN PATENT DOCUMENTS

DE          42 09 914 A1      9/1993

(Continued)

*Primary Examiner*—Richard Ridley
*Assistant Examiner*—James Pilkington
(74) *Attorney, Agent, or Firm*—Clark Hill PLC

(57) ABSTRACT

A belt tensioner for tensioning the belt of a belt drive system includes an eccentric adjusting member, a pivot structure eccentrically mounted on the adjusting member for pivoting around the adjusting member, a belt-tensioning pulley mounted to rotate on the pivot structure, a biasing member that resiliently biases the pivot structure in a belt-tightening direction, and a coupling structure. The coupling structure temporarily couples the pivot structure to the adjusting member to pivot with it during a belt installation procedure, and the configuration keeps the coupling structure unloaded except for a limited period of time during the installation procedure such that the coupling structure can be installed and removed easily. The tensioner is rendered operative after the pivot structure is uncoupled from the adjusting member, thus allowing the pivot structure to pivot with respect to the adjusting member.

22 Claims, 10 Drawing Sheets

U.S. PATENT DOCUMENTS

| | | | |
|---|---|---|---|
| 5,480,358 A | * | 1/1996 | Sakai et al. .................. 474/117 |
| 5,545,095 A | * | 8/1996 | Henderson .................. 474/135 |
| 5,702,315 A | * | 12/1997 | Sakai et al. .................... 474/94 |
| 5,919,107 A | * | 7/1999 | Stepniak ..................... 474/112 |
| 5,964,674 A | * | 10/1999 | Serkh et al. ................. 474/109 |

FOREIGN PATENT DOCUMENTS

| | | |
|---|---|---|
| DE | 43 40 865 A1 | 6/1995 |
| DE | 44 39 384 A1 | 6/1995 |
| DE | 199 10 828 A1 | 9/2000 |

\* cited by examiner

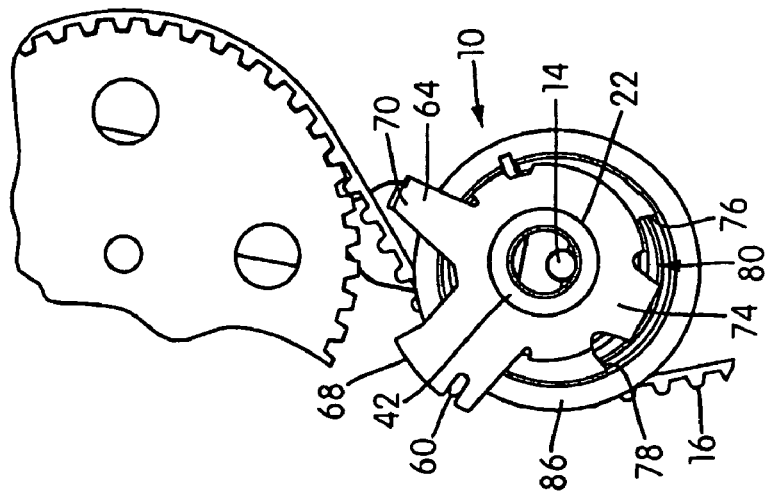
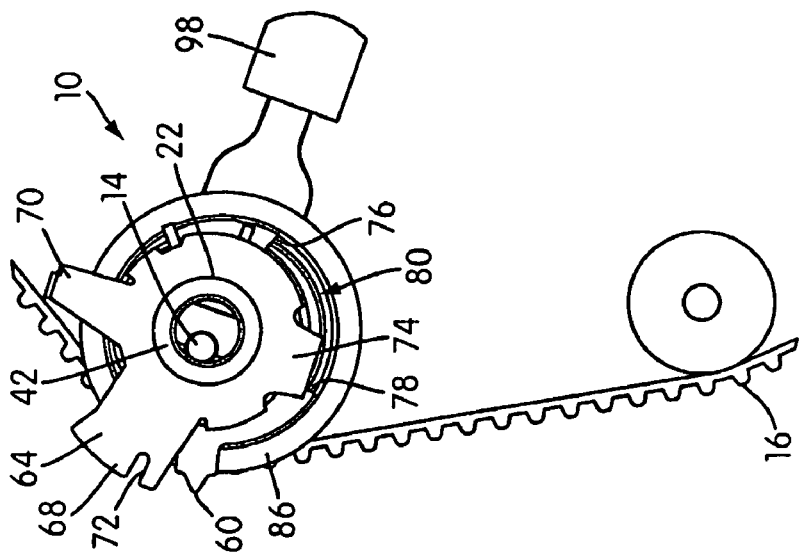
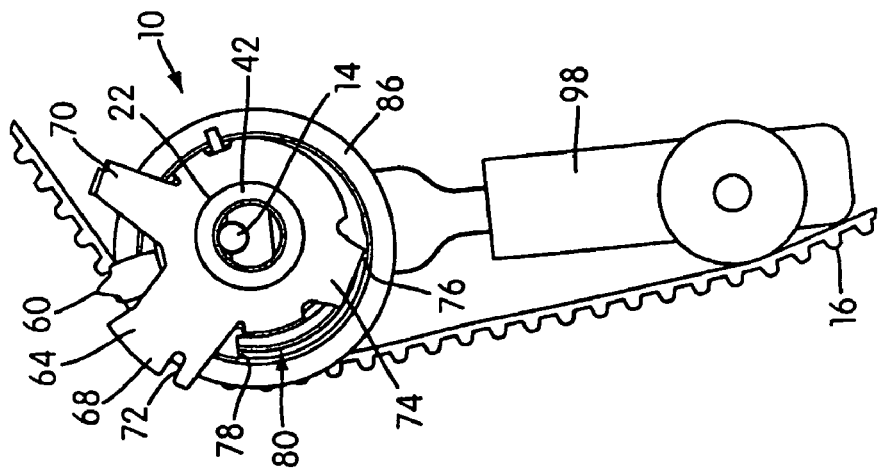

BELT TENSIONER WITH INSTALLATION PIN

This patent application is a §371 of PCT/CA02/01201, filed Jul. 31, 2002, which claims priority to and all the benefits of U.S. Provisional Patent Application No. 60/308,612 filed on Jul. 31, 2001.

FIELD OF THE INVENTION

The present invention relates to belt tensioners and, in particular, to belt tensioners that can be installed more easily and precisely as part of an automotive belt drive system.

BACKGROUND OF THE INVENTION

Belt tensioners are generally well known devices that have been used previously in many belt-drive systems. It is conventional practice to use a tensioner to apply a constant belt-tensioning force, which compensates for increases in belt length due to wear and other factors. A common type of conventional belt tensioner has a fixed structure and a pivoted structure eccentrically mounted on the fixed structure by means of a pivot assembly, and the pivoted structure has a belt-engaging pulley rotationally mounted on it. A coil spring surrounds the pivot assembly and has its ends connected between the fixed and pivoted structures so as to bias the pivot structure in a belt take-up direction. As the pivoted structure moves from a position of minimum belt take-up to a position of maximum belt take-up, the spring biasing force decreases. Despite this varying spring force over the range of tensioner movement, substantially constant belt tension is maintained by the tensioner. U.S. Pat. No. 4,473,362, for example, illustrates these basic principles.

Various techniques are currently used to properly install timing belt tensioners on engines. One of the most commonly used techniques is to construct the tensioner with an eccentric adjusting member that forms part of the fixed structure; the eccentric adjusting member is rotated around the tensioner mounting bolt and thus moves the tensioner away from the belt (to allow the belt to be routed into the drive system) or towards the belt (to apply tension in the drive system). A typical installation procedure when using the current standard design includes mounting the tensioner on the engine with the eccentric member in the extreme position away from the belt, routing the belt into the drive system, rotating the eccentric member towards the belt until the tensioner reaches the nominal operating position, and locking the tensioner with the mounting bolt.

Because the eccentric adjusting member is located within the periphery of the tensioner pivot, its size is limited and the maximum linear stroke of the tensioner into and out of the drive system (approximately equal to twice the eccentricity of the eccentric member) may be insufficient to allow for proper installation of the belt. Additionally, recent trends to increase the number of components in the timing drive system and to increase the tolerance range on belt dimensions, as well as requirements from engine OEM's that belts from more than one supplier (i.e., belts with different tolerances) can be used on the same timing drive system, make it very difficult for a tensioner equipped with a regular eccentric member to have enough installation travel to accommodate all situations.

In order to address situations where the installation stroke provided by the above design does not sufficiently move the tensioner away from the belt to allow the belt to be routed into the drive system, an improved design was developed to increase the installation stroke. In particular, in such improved design tensioners, an installation pin locks the pivoted structure to a fixed portion of the tensioner assembly at an extreme position away from the belt (known as the load stop position). The pin is inserted through the pivoted structure into a fixed component (e.g., base plate, shaft, front plate, etc.) and counters the action of the spring biasing member (tending to force the pivoted structure toward the belt). The installation procedure using the enhanced design includes mounting the tensioner on the engine with the eccentric member in the extreme position away from the belt, routing the belt into the drive system, releasing the pin, rotating the eccentric member towards the belt until the tensioner reaches the nominal operating position, and locking the tensioner in place with the mounting bolt. This improved design increases the amount of space available to install the belt by holding the pivot arm as far away from the belt as possible.

A disadvantage of such "enhanced" design, however, is that the pin is loaded by the spring (because the pin is required to hold the pivot arm at the load stop position, away from the belt). As a result, it can require significant force to remove the pin from the arm and the fixed component, which makes pin removal (and hence the tensioner installation procedure) difficult. Furthermore, when the pin is removed and the pivoted structure is "released" to pivot freely, the pivoted structure may pivot all the way into contact with the tensioner free arm stop with significant impact force. Such impact force can damage the internal components of the tensioner, particularly if the tensioner uses a high torque spring.

SUMMARY OF THE INVENTION

It is an object of the present invention to provide a belt tensioner that is generally easier to install than prior art tensioners. In accordance with the principles of the present invention, this objective is achieved by providing a belt tensioner for tensioning a drive belt or timing belt of a belt drive system including an eccentric adjusting member, a pivot structure, a belt-tensioning pulley, a coil torsion spring or other biasing member, and a coupling structure. The coupling structure may be delivered or provided by the tensioner manufacturer as part of the tensioner assembly or it may be fitted into the tensioner assembly only later, as part of the actual tensioner installation process, e.g., by an automobile manufacturer.

The eccentric adjusting member is configured to be mounted on a mounting surface of an engine frame. The eccentric adjusting member is adjustable in a first, belt-tightening direction and a second direction away from the first, belt-tightening direction; the pivot structure is eccentrically mounted on the adjusting member and pivots around the adjusting member; the belt-tensioning pulley is rotationally mounted on the pivot structure; and the coil torsion spring or other biasing member resiliently biases the pivot structure in a belt-tightening direction. The coupling structure temporarily couples the pivot structure to the eccentric adjusting member so that the pivot structure rotates with the adjusting member during an installation procedure in which the eccentric adjusting member is rotated away from the belt in order to allow the drive belt or timing belt to be installed into the belt drive system. Coupling the pivot structure to the eccentric adjusting member in that manner significantly increases the tensioner stroke away from the belt and therefore makes it easier to install the belt.

After the belt has been installed, the adjusting member is rotated back toward the belt until the pivot structure comes to rest against the free arm stop and/or against the belt. When the pivot structure comes to rest against the free arm stop and/or the belt, the stop and/or belt will become subjected to the spring load, so little or no spring load force will be transmitted to the coupling structure through the pivot structure. Therefore, the coupling member can be removed from the tensioner relatively easily at that point in the installation process to render the tensioner operative. The tensioner is rendered operative by uncoupling the pivot structure from the adjusting member, thus allowing the pivot structure to pivot around the eccentric adjusting member.

Thus, in accordance with another aspect of the present invention, the object of the invention is achieved by providing a method of installing a belt tensioner for a belt drive system, which tensioner includes an eccentric adjusting member; a pivot structure that is eccentrically mounted on the adjusting member and that pivots around the adjusting member; a belt-tensioning pulley that is rotationally mounted on the pivot structure; and a spring or other biasing member that biases the pivot structure in a belt-tensioning direction. The method includes initially mounting the adjusting member on the motor vehicle engine, e.g., with a relatively loose fixing bolt or stud; pivoting the adjusting member and, because it is (or becomes) coupled with the adjusting member, the pivot structure away from the belt against the biasing force of the biasing member; mounting the belt on the components of the belt drive system; moving the adjusting member so that the pivot structure moves toward the belt and relieves biasing force in the biasing member; uncoupling the pivot structure from the adjusting member; moving the adjusting member so that the pulley engages the belt and causes the pivot structure to pivot in the opposite direction (i.e., the direction away from the belt) against the biasing force of the biasing member; and, after the tensioner has been set in a predetermined tensioning relationship with the belt, tightening the fixing bolt or stud to fix the adjusting member in place.

BRIEF DESCRIPTION OF THE DRAWINGS

The accompanying drawings facilitate an understanding of the various embodiments of this invention. In such drawings.

FIG. 9 is rear plan views illustrating the installation procedure of the belt tensioner in accordance with one embodiment of the present invention;

DETAILED DESCRIPTION OF THE INVENTION

Figure 1:
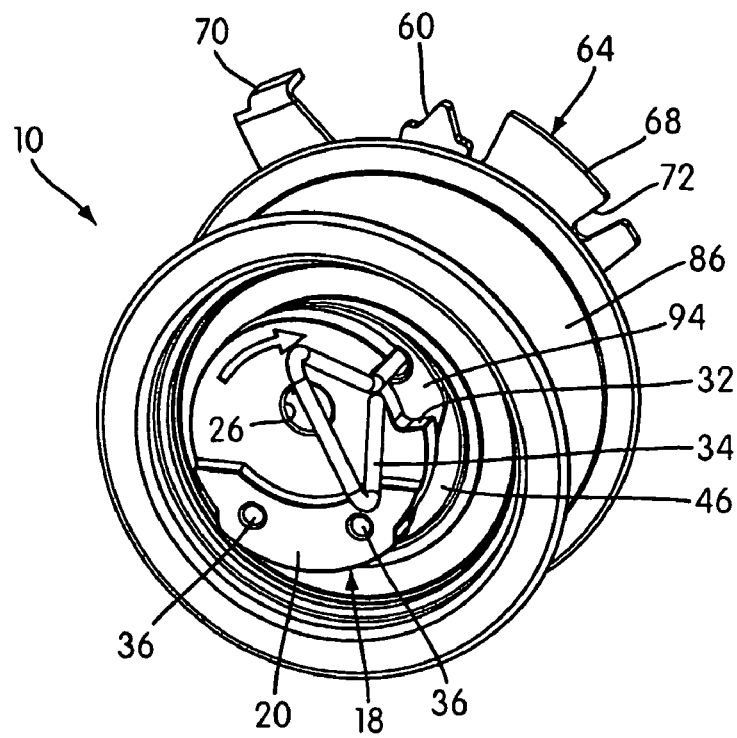
FIG. 1 is a perspective view of a belt tensioner constructed in accordance with one embodiment of the present invention.
Figure 2:
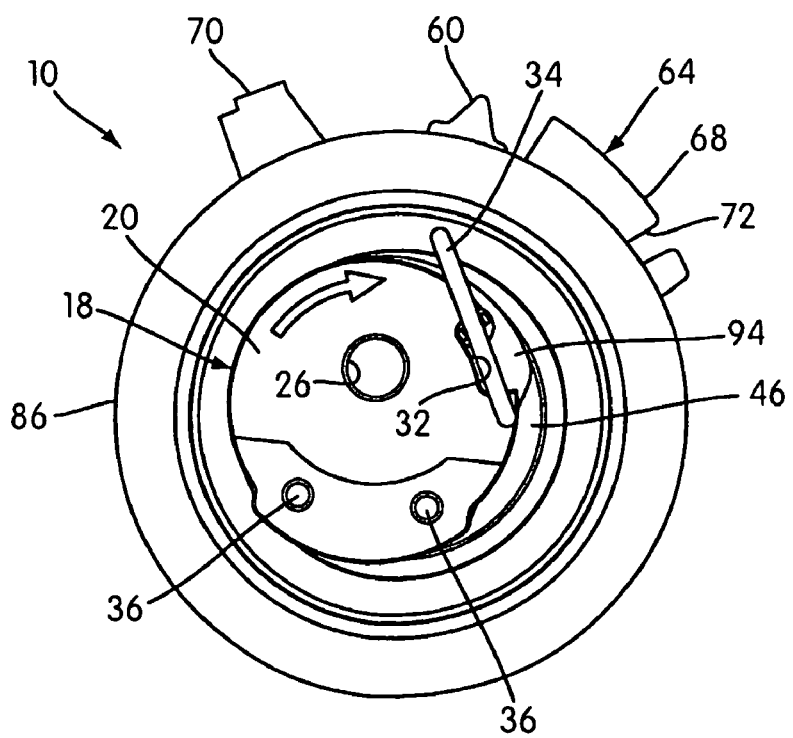
FIG. 2 is a front plan view of the belt tensioner in accordance with one embodiment of the present invention.
Figure 3:
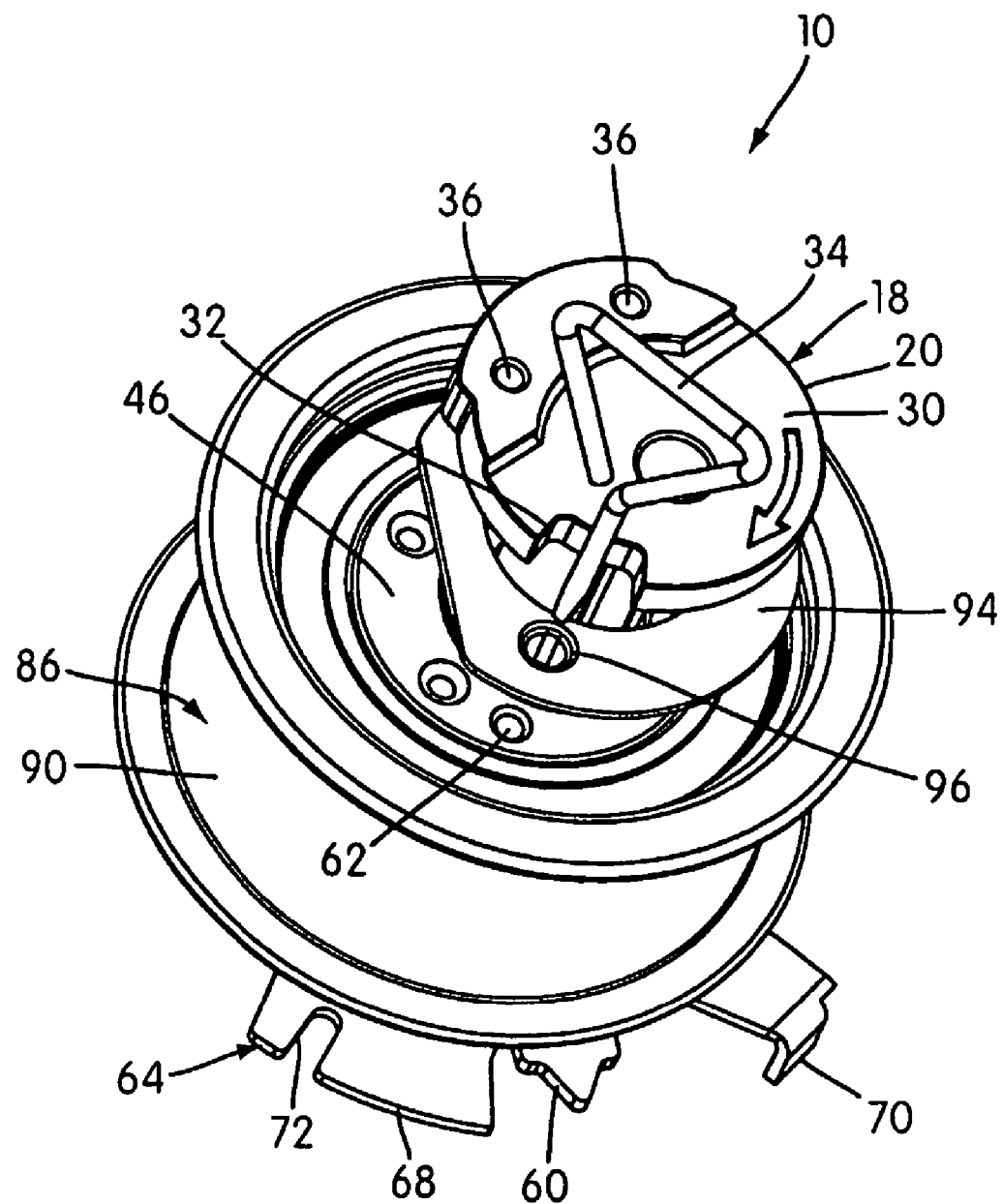
FIG. 3 is an exploded view of the belt tensioner in accordance with one embodiment of the present invention.
Figure 4:
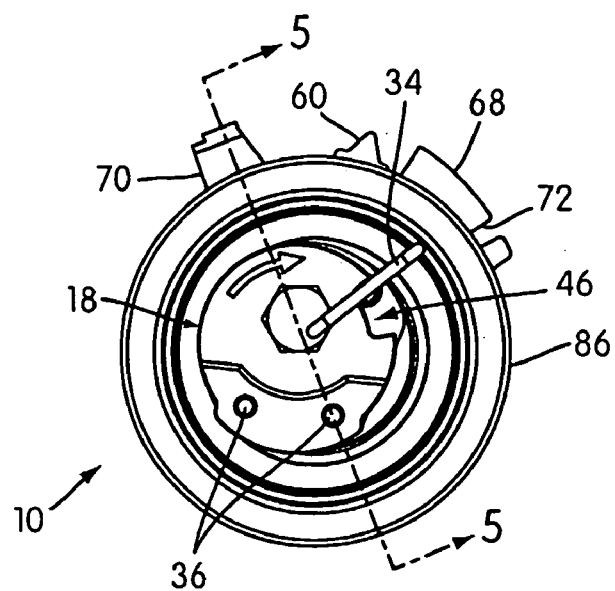
FIG. 4 is a front plan view of the belt tensioner in accordance with one embodiment of the present invention.

As illustrated in the drawings, a belt tensioner 10 which embodies the principles of the present invention mounted on an engine block or frame 12 by a threaded fixing bolt 14 (shown in FIG. 5) and is in tensioning engagement with a drive or timing belt 16 (shown in FIGS. 8 and 9). Alternatively, the engine block 12 may include a stud (not shown) extending from it on which the tensioner is mounted and to which the tensioner is secured by a nut. Other means of securing the tensioner 10 to the engine block 12 are also contemplated.

The tensioner 10 includes an inner, eccentric adjusting member 18 that is used to move the tensioner pivot structure (lever arm 46) toward and away from the belt 16. As illustrated, the eccentric adjusting member 18 can have a nested, two-component configuration. In particular, the illustrated adjusting member 18 consists of an inner installation shaft 20 and a surrounding, generally sleeve-shaped pivot shaft 22, which are secured together with a friction fit. The installation shaft 20 and the pivot shaft 22 are secured together after the other components of the tensioner (i.e., the arm 46, the pulley, 86, the ball bearing assembly 88, the torsion spring 82, etc., which are described in more detail below) have been assembled onto the pivot shaft 22.

The installation shaft 20 of the adjusting member 18 is generally cylindrical, with a main, body portion 24 and a longitudinal bore 26 extending axially through it. As illustrated most clearly in FIG. 5, the fixing bolt 14 (or mounting stud) extends through the longitudinal bore 26, and the adjusting member 18 (installation shaft 20) rotates around the fixing bolt 14. More particularly, the longitudinal bore 26 is displaced laterally or radially relative to the central, longitudinal axis 28 of the cylindrical, body portion 24 of the installation shaft 20, and the distance between the axis of the longitudinal bore 26 (fixing bolt 14) and the central, longitudinal axis 28 provides the adjustment eccentricity of the adjusting member 18. (Depending on the amount of eccentricity and the radii of the installation shaft 20 and the longitudinal bore 26, the periphery of the longitudinal bore 26 may, as illustrated, be internally tangent or almost internally tangent to the periphery of the body portion 24 of the installation shaft 20.) Accordingly, the installation shaft 20, and hence the eccentric adjusting member 18, pivots eccentrically around the fixing bolt 14.

In the illustrated embodiment, the installation shaft 20 also has a cam-shaped, radially outwardly projecting flange 30 that preferably is formed integrally with, but which could also be formed separately from and connected to, the main body portion 24 of the installation shaft. Preferably, the flange 30 is formed at the end of the body portion 24 that is furthest from the engine block 12. A slot 32 or other suitable engaging feature (such as a protrusion) is formed in the exterior periphery of the flange 30; the slot 32 functions cooperatively with a removable installation pin 34 as the coupling structure during a belt installation procedure in which the belt 16 is trained about the tensioner 10 and installed in the belt drive system, as described in greater detail below. Together, the slot 32 and pin 34 form a lost motion-type coupling between the working eccentric or pivot arm of the tensioner 10 and the eccentric adjusting member 18. Although a lost motion-type coupling arrangement is specifically illustrated, any coupling structure or arrangement that temporarily couples the arm 46 to the eccentric adjusting member 18, such that the arm pivots with the eccentric adjusting member during the tensioner and belt installation procedure, can be used.

The flange 30 also has openings 36, which openings 36 receive the prongs of an adjusting tool 98 (FIGS. 8 and 9) that is used to rotate the eccentric adjusting member 18 (and hence the pivot structure) during the installation procedure.

As noted above, the pivot shaft 22 of the adjusting member 18 is generally sleeve-shaped, with a main, cylindrical portion 38 that has a cylindrical bore 40 extending axially or longitudinally through it. The cylindrical, main body portion 24 of the installation shaft 20 is received within the bore 40 of the pivot shaft 22 with a friction fit, and together the installation shaft 20 and the pivot shaft 22 form the eccentric adjusting member 18. Other two-piece eccentric adjusting member geometries besides cylinder-in-cylinder are known in the art and may be employed as well. Alternatively, if so desired, a single-piece configuration can be used for the eccentric adjusting member 18.

Figure 5:
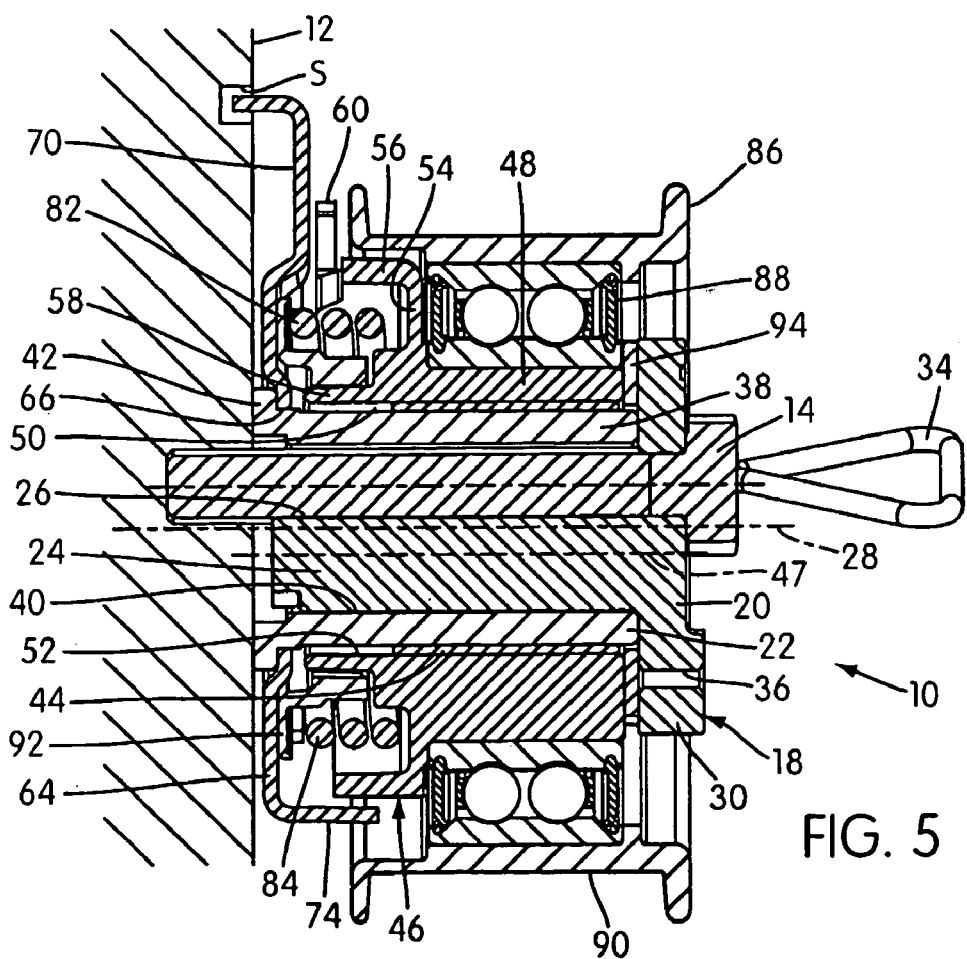
FIG. 5 is a cross-sectional view taken through line 5-5 in FIG. 4 showing the belt tensioner in accordance with one embodiment of the present invention.
Figure 6:
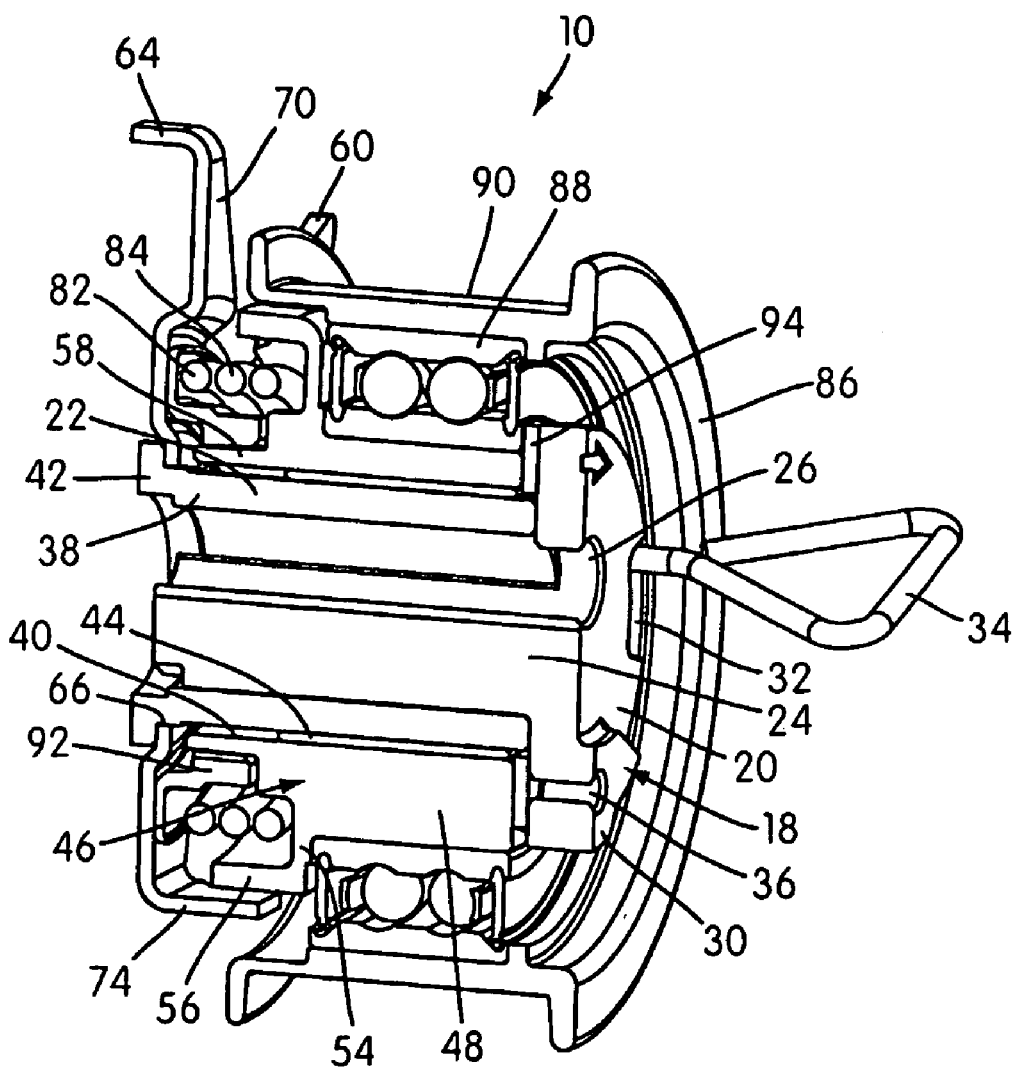
FIG. 6 is a cross-sectional view of the belt tensioner in accordance with one embodiment of the present invention.
Figure 7:
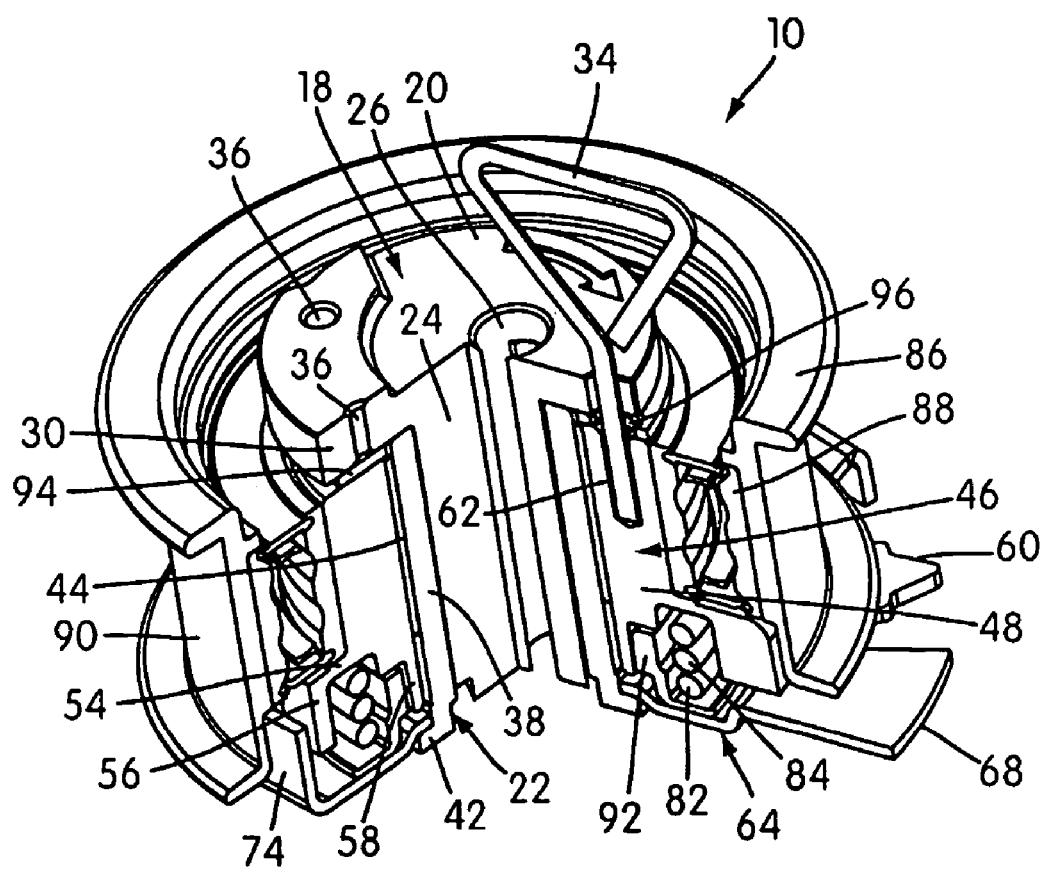
FIG. 7 is a perspective view of the belt tensioner in accordance with one embodiment of the present invention with a portion removed to thereby illustrate the inner components of the belt tensioner.

In the illustrated embodiment, the pivot shaft 22 also has an outwardly projecting flange 42 that is positioned closest to the engine block 12. As shown in FIG. 5, the end surface of the pivot shaft 22, e.g., the end the projecting flange 42, is disposed in surface-to-surface engagement with a mounting surface provided on the engine block 12. This mounting surface can be provided by the engine block 12 itself, or by a bracket or the like fixed to the engine block 12.

A working eccentric or lever arm 46 functions as the tensioner pivot structure. The lever arm 46 has a main cylindrical portion 48 with a cylindrical exterior surface around which the pulley 86 fits and a bore 50 extending longitudinally through it. The lever arm 46 fits around the eccentric adjusting member 18, which fits within the bore 50, and rotates around the eccentric adjusting member 18. The bore 50 is displaced laterally or radially relative to the central, longitudinal axis 47 (the pulley axis) of the main cylindrical portion 48 of the arm 46. Accordingly, the arm 46 pivots eccentrically relative to the adjusting member 18 as it rotates around it. The distance between the axis 47 of the arm 46 and the central, longitudinal axis 28 of the cylindrical, body portion 24 of the installation shaft 20 (the central axis of the eccentric adjusting member 18, around which the arm 46 pivots) provides the working eccentricity of the tensioner. By coupling the lever arm 46 (pivot structure) to the eccentric adjusting member 18 during the installation procedure, the working eccentricity of the lever arm 46 is "added" to the adjustment eccentricity of the eccentric adjusting member 18 and the installation stroke of the tensioner is increased significantly.

As further shown, a pivot bushing 44, made from PTFE or similar anti-friction material, is provided to limit friction between the lever arm 46 and the eccentric adjusting member 18. The pivot bushing is press fit into the bore 50, making a tight fit with the interior surface 52 of the bore 50 so as to rotate with the lever arm 46. The pivot bushing 44 makes a sliding or clearance fit around the eccentric adjusting member 18 (the exterior surface of the pivot shaft 22), which allows the pivot structure or lever arm 46 to pivot relatively smoothly and frictionlessly around the eccentric adjusting member 18.

In the illustrated embodiment, an annular wall portion 54 is provided and extends radially outwardly from between the opposite longitudinal ends of the lever arm 46, generally closer to the end adjacent the engine block 12. An outer cylindrical wall portion 56 extends from an outer periphery of the annular wall portion 54 towards the engine block 12, in generally concentric relation to an end portion 58 of the lever arm 46 that is located closest to the engine block 12.

A radially projecting pointer 60 extends from the arm 46. Preferably, the pointer 60 extends from a relatively thicker portion of the cylindrical wall portion 56 closest to the engine block 12, although it may extend from a portion of the arm 46 furthest from the engine block 12 or be formed as a protrusion on top of the arm. Various locations certainly are permissible. The pointer 60 is used to gauge or monitor installation of the tensioner 10 to make certain that the tensioner 10 engages the belt 16 with a predetermined amount of static belt-load force during the initial set-up.

The arm 46 further has a pin hole 62 to receive the pin 34 during the installation procedure, which is explained in greater detail below. Together with the slot 32, the pin constitutes part of the temporary coupling structure.

A base plate 64 is positioned adjacent the engine block 12 and has a circular opening 66 which receives the end of the adjusting member 18. In the illustrated embodiment, the base plate 64 engages the flange 42 of the pivot shaft 22 such that the base plate 64 is held in slightly spaced relation from the engine block 12. However, the base plate 64 may be engaged with the adjusting member 18 in any other suitable manner.

The base plate 64 has a projecting extension portion 68 and a projecting locating portion 70 that is used to position the tensioner on the engine. The extension 68 extends radially outwardly beyond the outer radial surface of the pulley 86, so that the portions 68 can be clearly seen when the tensioner 10 is being installed on the engine block 12 as illustrated most clearly in FIGS. 8-11. The extension portion 68 of the base plate 64 also has a notch 72 located along its exterior periphery, and the notch is used to gauge the position of the pointer 60 and hence the belt load force.

The base plate 64 further includes a bent tab portion 74, which extends axially in a direction away from the engine block 12, as shown in FIG. 5. The bent tab portion 74 functions as a stop member, which remains fixed during operation of the tensioner 10 and cooperates with stop surfaces 76 and 78 (shown in FIGS. 9A-9C) of the arm 46 to limit the angular or pivotal position of the arm 46. The stop surfaces 76 and 78 are opposing surfaces formed on opposite sides of an opening 80 formed in the arm 46, as shown most clearly in FIGS. 9A-9C. The tab portion or stop member 74 of the base plate 64 engages the stop surfaces 76 and 78 upon rotation of the arm 46 beyond a predetermined angular range to limit the possible extent of pivotal movement of the arm 46 about the eccentric adjusting member 18.

The stop surface 76 provides a free arm stop, and the stop surface 78 provides a load stop. More specifically, engagement of the stop surface 76 with the stop member 74 defines the free arm stop position, and engagement of the stop surface 78 with the stop member 74 defines the load stop position.

Other base plate configurations are also known in the art. For example, a similar base plate-type structure could be provided at the opposite end of the tensioner, opposite to the engine block 12. Alternatively, the base plate could be eliminated altogether, depending on the specific tensioner configuration. Moreover, the tensioner stops (free arm and load) can be provided by means other than a portion of a base plate and/or other than the ends of a slot in the pivot arm. Additionally, the load stop could be eliminated altogether.

In order to optimize the stroke-increasing effectiveness of the invention, the temporary coupling structure (i.e., the position of the slot 32 in the eccentric adjusting member 18 and the position of the pin 34 in the arm 46) should be configured and/or positioned such that the adjusting member 18 will be pivoted to its position of maximum distance from the belt at the same time as the arm 46 reaches the load stop position. Additionally, the installation shaft 18 may be pivoted away from the belt 16 in either the clockwise or the counterclockwise direction; the specific direction, however, must be determined and set during the design process in order to properly configure the coupling structure, i.e., the position of the pin 34 and the slot 32.

Figure 8C:
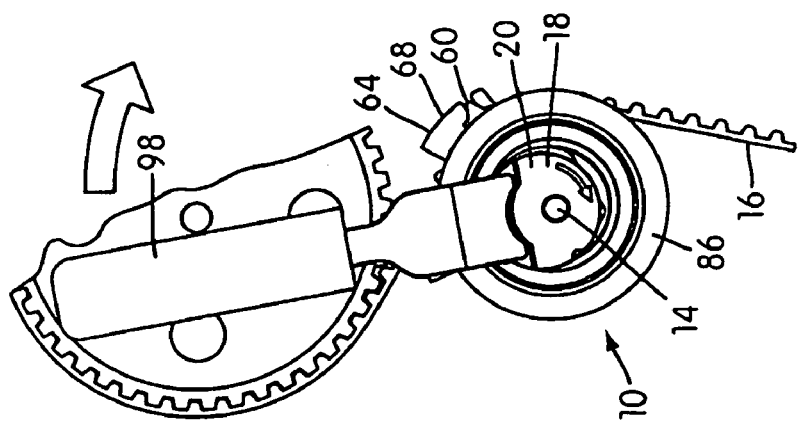
FIG. 8 is front plan views illustrating the installation procedure of the belt tensioner in accordance with one embodiment of the present invention.
Figure 8B:
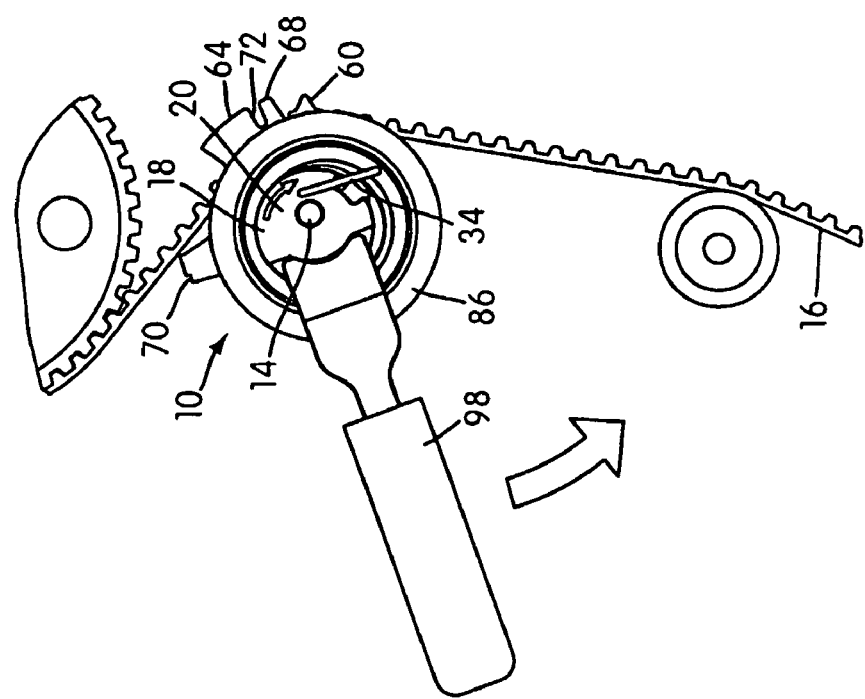
Figure 8A:
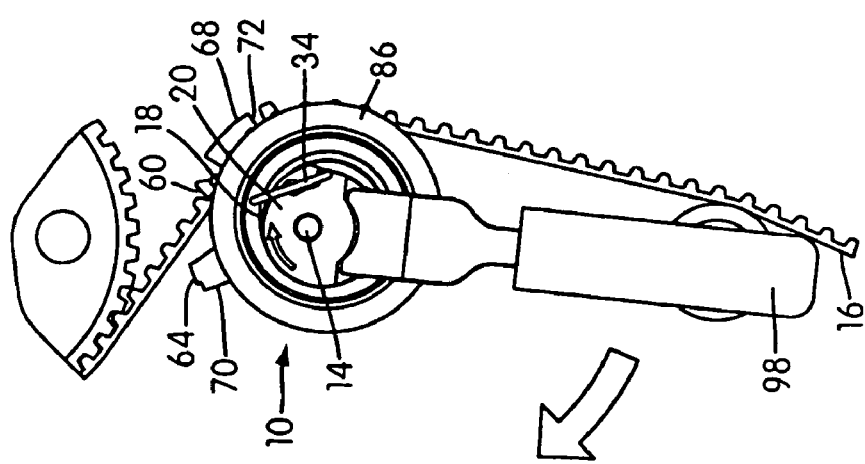

A torsion spring 82 is connected between the base plate 64 and the arm 46. More particularly, the spring 82 has a main portion 84 coiled freely about the main body portion 48 of the pivot arm 46, generally near a portion of the adjusting member 18 that is positioned closest to the engine block 12. The end of the torsion spring 82 closest to the engine block 12 engages a spring stop that may be fixed to the base plate 64 or any other fixed structure, such as the engine block 12. The other end of the torsion spring 82 is connected to the arm 46. The connection between the other end of the torsion spring 82 and the arm 46 is conventional and operates to bias the arm in a counter-clockwise (i.e., belt-engaging) direction about the adjusting member 18, as shown in FIGS. 8A-8C for the illustrated exemplary embodiment.

Pulley 86 is disposed annularly around the arm 46 in conventional fashion. Preferably, the pulley 86 is rotationally mounted on the arm 46 by means of a ball bearing assembly 88. The ball bearing assembly 88 is mounted between an inner cylindrical surface of the pulley 86 and an outer cylindrical surface of the arm 46. The pulley 86 provides an exterior annular surface 90, which is preferably smooth to engage the preferably flat exterior surface of the poly-V or timing belt 16.

A spring support 92 may, as shown, be disposed generally within the confines of the main spring portion 84. If provided, the spring support 92 constitutes a bearing member between the base plate 64 and the end portion 58 of the arm 46.

Additionally, a thrust washer 94 provides a bearing member between an opposite end of the lever arm 46 and the flange 30. The thrust washer 94 has a hole 96 that receives the pin 34 (either during tensioner assembly or during the installation operation), and the diameter of the hole 96 is smaller than the diameter of the pin 34. Thus, when the pin 34 is inserted through the thrust washer 94, the edges of the hole 96 deform slightly and retain the pin 34 while the tensioner is being transported prior to being installed on the engine block 12. That feature may be eliminated if the pin 34 is not shipped together with the tensioner 10 (e.g., if the pin is integrated into the installation tool 98) and the pin 34 is first inserted into the tensioner 10 during installation, either as integrated with the installation tool 98 or as a separate component altogether.

Installation and operation of the belt tensioner 10 will now be described. Initially, the locating portion 70 of the base plate 64 is positioned within a slot S (as shown in FIG. 5) provided in the engine block 12, and the fixing bolt 14 is loosely fitted into a threaded opening within the engine block 12. Because the fixing bolt 14 is not initially tightened, the adjusting member 18 can be rotated or pivoted eccentrically around the fixing bolt 14, e.g., using an appropriate installation and adjusting tool 98 such as shown in FIGS. 8 and 9, which engages the pair of openings 36 in the flange 30 of the installation shaft 20.

The belt 16 is routed on or around all pulleys/sprockets of the belt drive system of the engine except for the last component for belt installation. Because of the position of the tensioner 10 on the engine block 12, the tensioner 10 must be rotated or pivoted away from the belt 16 in order to install the belt on or around the last component for belt installation.

During tensioner assembly, if it was not supplied with the tensioner, the removable pin 34 is inserted into the hole 62 in the arm 46, passing through the slot 32 in the adjusting member 18 and the hole 96 in the thrust washer 94. The slot 32 allows the eccentric adjusting member 18 to rotate in both directions relative to the arm or pivot structure 46 by a limited amount, thus providing a lost motion-type of coupling as noted above, and using a slot generally makes it easier and simpler to insert the pin into the tensioner during tensioner assembly (or during the tensioner installation process, if the pin is not pre-provided).

Figure 10:
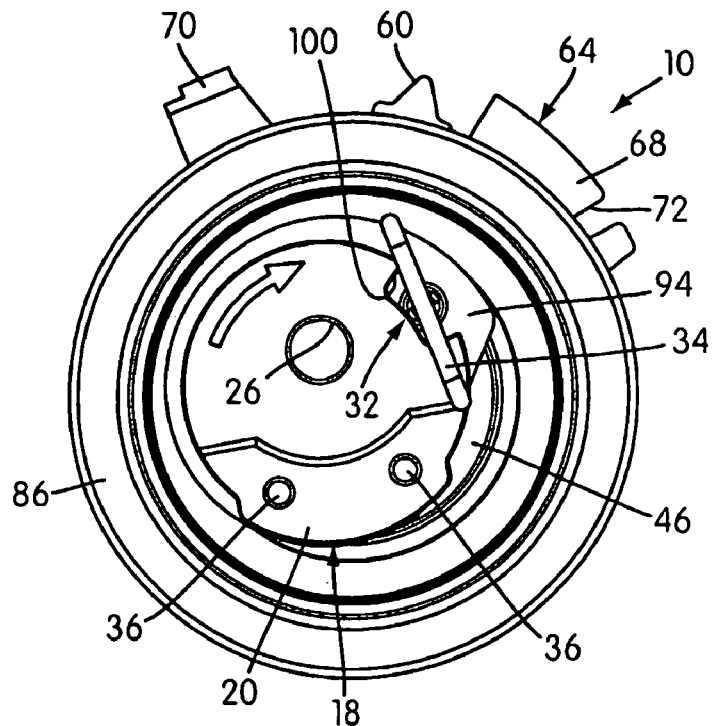
FIG. 10 is a front plan view illustrating the belt tensioner in accordance with one embodiment of the present invention with the arm at the free arm stop position and the adjusting member not engaged with the installation pin.
Figure 11:
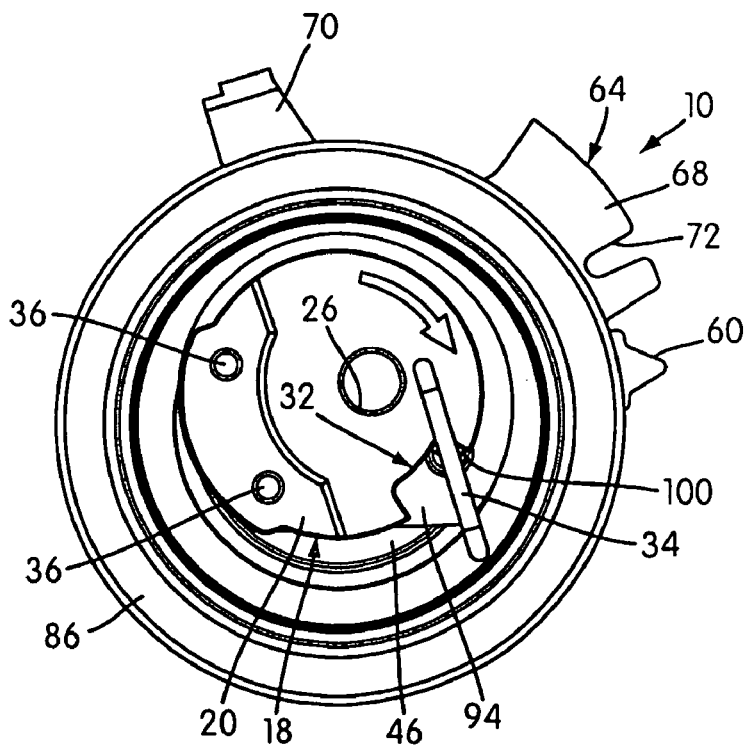
FIG. 11 is a front plan view of the belt tensioner in accordance with one embodiment of the present invention with the arm at the load stop position and the adjusting member engaged with the installation pin and in the extreme position away from the belt.

A pair of prongs on the installation and adjusting tool 98 are inserted into the pair of openings 36 in the adjusting member 18, and the installation and adjusting tool 98 is used to rotate the adjusting member 18 so that the pulley 86 is pivoted away from the belt 16, as indicated by the arrow in FIG. 8A. As the eccentric adjusting member 18 is pivoted further away from the belt, end surface 100 of the slot 32 in the adjusting member 18 (as shown most clearly in FIGS. 10 and 11) will contact the pin 34. When that contact occurs, the lever arm 46 will be temporarily coupled to the eccentric adjusting member 18. As the eccentric adjusting member 18 is pivoted further away from the belt, the arm 46 will rotate with the eccentric adjusting member from the free arm stop position (as shown in FIGS. 10, 8A, and 9A) towards the load stop position (as shown in FIGS. 11, 8B, and 9B). Because it is (temporarily) coupled to the eccentric adjusting member 18 by means of the pin 34, the arm 46 can be rotated through its operating range together with the eccentric adjusting member 18.

Rotation of the adjusting member 18 away from the belt 16 may be continued until the arm 46 reaches the load stop position, as most clearly shown in FIG. 11. Once the arm 46 reaches the load stop position (or prior to the arm 46 reaching the load stop position, if the system geometry permits it), the belt 16 is installed over the last component of the belt drive system while the tensioner 10 is held in the load stop position. Preferably, the tensioner is designed so that the arm 46 reaches the load stop position at the same time (or approximately the same time) as the adjusting member rotates to an angular position that moves the tensioner assembly as far from the belt as possible, i.e., at a point where the axis of eccentricity of the adjusting member is aligned with the belt load direction.

As noted above, the eccentricity of the lever arm 46 is "added" to the eccentricity of the eccentric adjusting member 18; thus, the overall tensioner stroke is increased, and it will be significantly easier to install the belt 16 around the final component and into the belt drive system than in the case of previous tensioner configurations. Thus, by engaging the arm 46 to the adjusting member 18 via the coupling pin 34, the arm 46 can be rotated, within its operating range, together with the adjusting member. This significantly increases the length of the effective installation eccentric, which can be defined as the distance between the pulley center axis and the mounting bolt axis, as illustrated FIGS. 12 and 13.

By way of example, for a tensioner assembly having an installation eccentricity of 5.0 millimeters and an arm eccentricity of 4.5 millimeters, the active installation stroke (distance the pulley moves laterally away from the belt) increases approximately three-fold, from 2.2 millimeters to 6.2 millimeters, over 80° of rotation of the eccentric adjusting member, of which approximately the first 15° is with the pivot arm uncoupled and approximately the last 65° is with the pivot arm coupled to the adjusting member via the coupling structure (pin 34). This results in a more efficient design of the tensioner and eliminates the need to increase the adjusting member eccentricity to achieve the necessary installation stroke, which, in turn, reduces potential packaging difficulties and tensioner cost.

Figure 12:
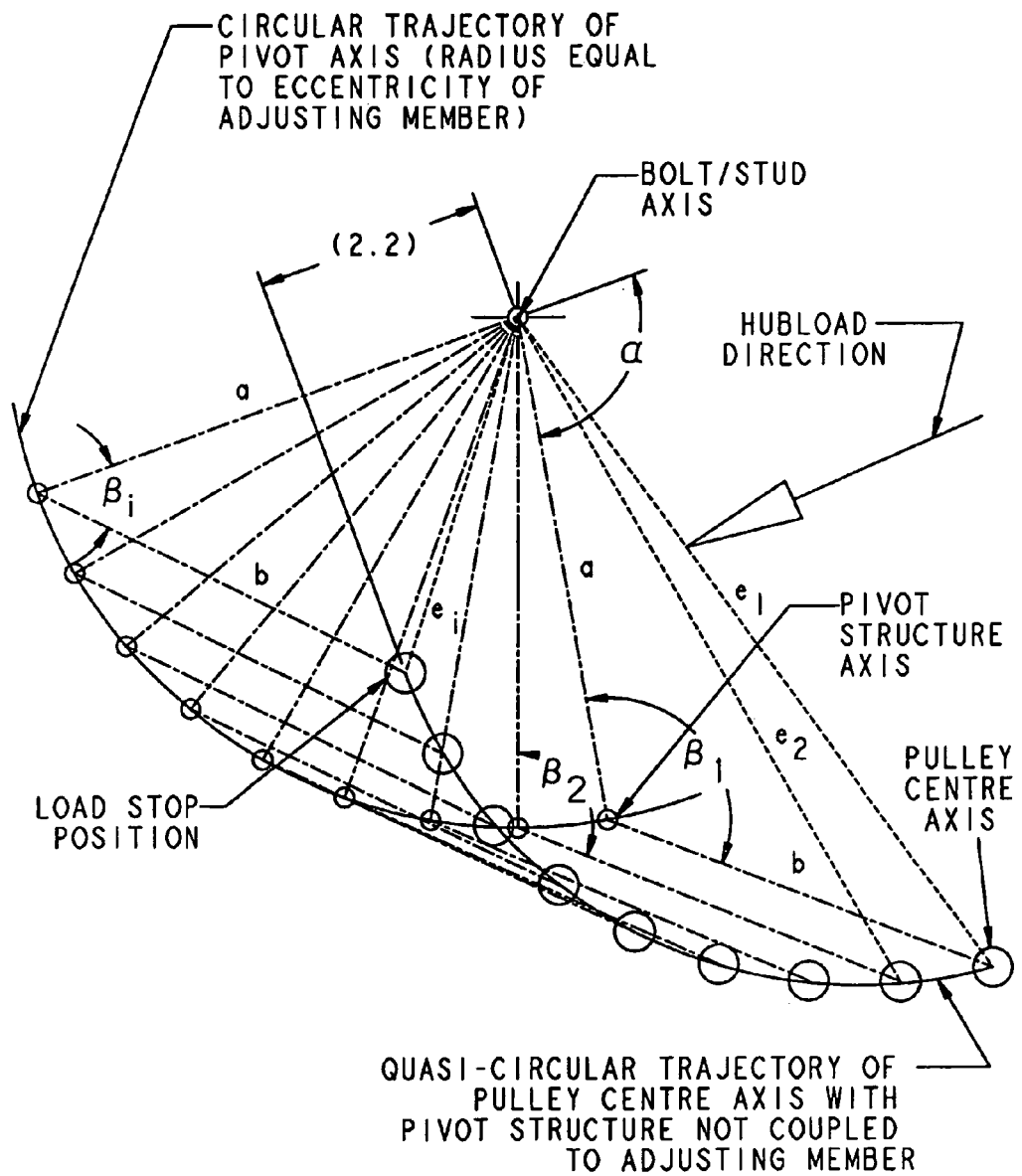
FIG. 12 is a diagram illustrating the tensioner installation kinematics without the pivot arm coupled to the eccentric adjusting member.
Figure 13:
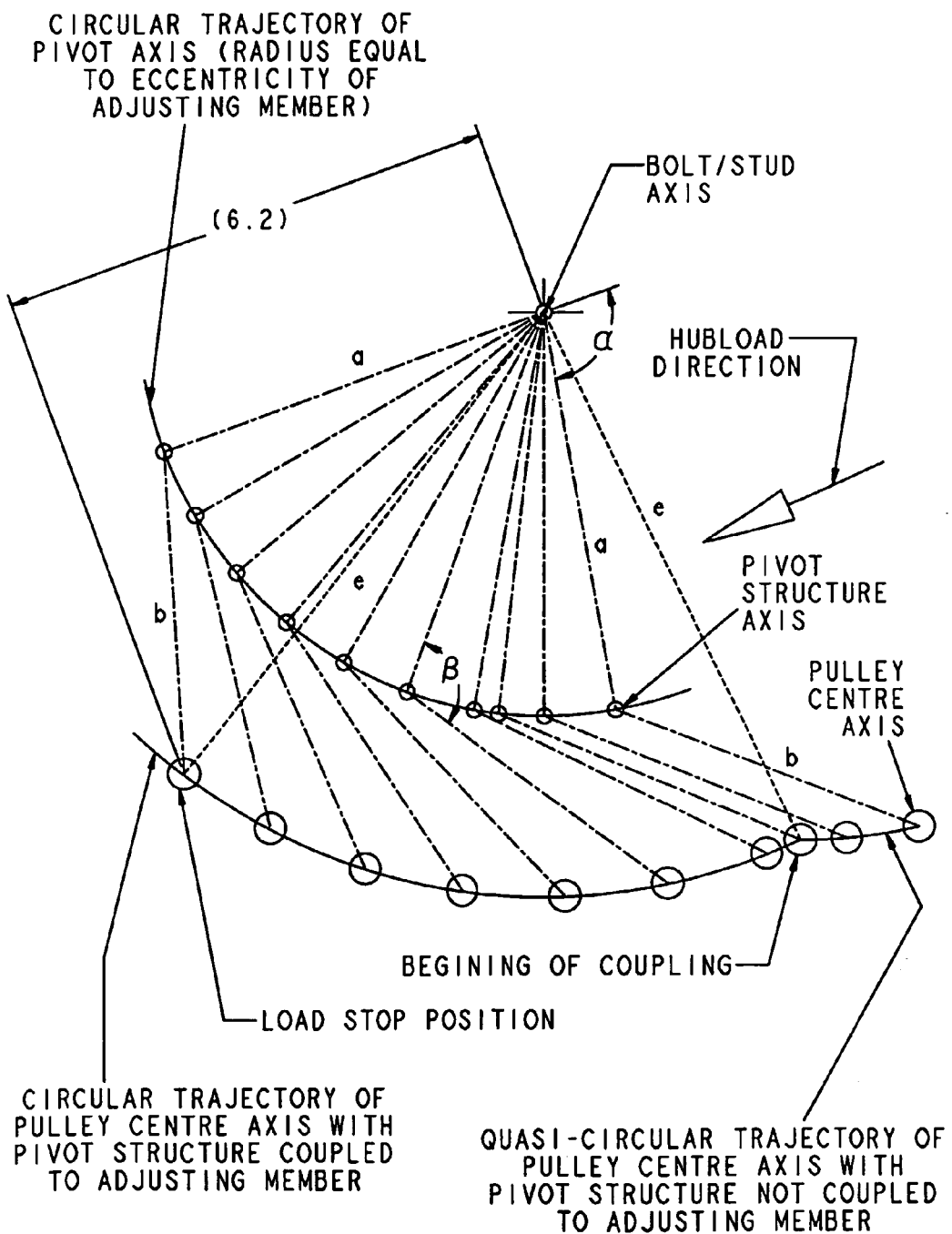
FIG. 13 is a diagram illustrating the tensioner installation kinematics initially without the pivot arm coupled to the eccentric adjusting member and then with the pivot arm coupled to the eccentric adjusting member, as per the present invention.

This benefit is illustrated diagrammatically in FIGS. 12 and 13. As illustrated in FIG. 12, as the installation eccentric rotates eccentrically around the installation bolt or stud with the two components not coupled together, the arm remains pressed against the free arm stop by the torsion spring, and the mobile (active) components of the tensioner (arm, bearing, pulley, washers, etc.) do not move relative to the fixed components (pivot shaft, base plate, etc.). In other words, the only component that rotates effectively during such uncoupled rotation of the adjusting member is the installation eccentric (installation shaft 20), which rotates inside of the pivot shaft 22 and around the mounting bolt or stud; the pivot arm is simply "carried along" translationally by the adjusting member.

The trajectory of the arm is quasi-circular, with a trajectory radius that is approximately equal to the length of the installation shaft eccentricity. As the installation eccentric rotates counter-clockwise (for example), it position relative to the hub load direction increases by $\Delta\alpha$. At the same time, assuming approximately pure translational movement of the base plate and pivot arm, the angle 13 formed by the installation eccentric a and the tensioner working arm eccentric b decreases by the same amount (for $\alpha>90°$). As a result, the effective installation eccentric e, which forms a triangle with the installation eccentric a and the working arm eccentric b and which is a function of a and b and the angle between them $\beta$, decreases with increased rotation of the installation shaft.

Mathematically expressed, where $e_1$ is the length of the effective installation eccentric at a first angular position a and $e_2$ is the length of the effective installation eccentric at a second angular position $\alpha+\Delta\alpha$, $$e_1^2 = a_1^2 + b_1^2 - 2ab \cdot \cos\beta, \text{ and}$$

$$e_2^2 = a_2^2 + b_2^2 - 2ab \cdot \cos(\beta - \Delta\alpha).$$

Therefore, as $\Delta\alpha$ increases with increasing rotation of the eccentric adjusting member, $(\beta-\Delta\alpha)$ tends to 0 and $\cos(\beta-\Delta\alpha)$ tends to 1. Thus is will be appreciated that $$e_2 < e_1.$$

As $\alpha$ approaches 180°, the length e of the effective installation eccentric continues to decrease to the point that e becomes smaller than the installation eccentric a (e<a). As that phenomenon occurs, stroke efficiency of the installation eccentric (i.e., the amount by which the position of the pulley center moves away from the belt in the hub load direction for each further degree of rotation of the eccentric installation adjusting member) tends to 0.

In contrast, coupling the pivot arm to the eccentric adjusting member in accordance with the invention ensures that the working eccentric b continues to contribute to the tensioner installation stroke as the eccentric adjusting member moves through its entire installation range of motion, thereby eliminating such degradation or dissipation of the tensioner stroke efficiency. As illustrated in FIG. 13, once the pin 34 comes into contact with the end surface 100 of the slot 32 in the eccentric adjusting member 18, that engagement locks the relative Position of the adjusting member 18 and the arm 46. Accordingly, the angle $\beta$ formed by the installation eccentric a and the arm b remains constant, regardless of the angle a defining the installation eccentric position (assuming approximately pure translational movement of the base plate and pivot arm). As a result, the effective length e of the installation eccentric remains constant, and the amount by which the position of the pulley center changes in the hub load direction for each further degree of rotation of the installation shaft (efficiency of the installation) decreases only marginally (due to the change in position), even as a approaches 180°.

Thus, the trajectory of the arm after the two components are coupled is circular, with the radius of the circle being equal to the effective installation eccentric e and given by the formula $$e^2 = a^2 + b^2 - 2ab \cdot \cos\beta = \text{constant}.$$

In fact, after the two components are coupled together, all of the mobile components move together with the installation eccentric around the mounting bolt axis, relative to the fixed components, thereby increasing the effective length of the installation eccentric and the available installation travel.

Before the adjusting member 18 has been pivoted away from the belt, when the arm 46 is at the free arm position and the adjusting member 18 has not engaged the pin 34 as shown in FIG. 10, the force on the pin 34 will be very small or virtually zero. However, once the adjusting member 18 has been pivoted far enough for it to engage or become coupled with the arm 46 (by virtue of the end surface 100 of the slot 32 engaging the pin 34), the arm 46 will be forced to rotate or pivot away from the belt along with the adjusting member 18. At that point, the arm 46 will be forced to rotate against the restoring or biasing force generated by the torsion spring 82, with the maximum spring load being generated when the arm 46 reaches the load stop position. Thus, while the arm 46 is being rotated or pivoted away from the belt along with the eccentric adjusting member 18, the pin 34 will be loaded by the biasing spring force as the torsion spring 82 resists that pivoting rotation away from the belt.

After the belt has been completely installed into the belt drive system and properly positioned, as indicated by the arrow in FIG. 8B, the adjusting member 18, and hence the arm 46, is rotated (or allowed to rotate under the influence of the torsion spring 82) back in the belt direction (e.g., clockwise, as illustrated). The adjusting member 18 is moved towards the belt 16 until the arm comes to rest against the free arm stop and/or the pulley engages the belt. When the pivot structure comes to rest against the free arm stop and/or the belt, the stop and/or belt will become subjected to the spring load, so little or no spring load force will be transmitted to the coupling structure through the pivot structure, and surface 100 of the slot 32 disengages from the pin 34 at that point. Thus, at that point, the spring load on the pin 34 will again be very small, if not zero, and the pin 34 can be removed from the tensioner quite easily. When the pin 34 is removed, arm 46 will be able to rotate or pivot unrestrained relative to the adjusting member 18, and the tensioner will be operative (although not yet completely set).

Once the pin 34 has been removed from the tensioner, the adjusting member 18 is rotated toward the belt 16 so as to press the pulley 86 into tensioning engagement with the belt 16. The adjusting member can be rotated either further back in the counter-clockwise direction (the original toward-the-belt direction) to press the pulley into tensioning engagement with the belt 16 at a "low" position, or it can be rotated once again in the clockwise direction (the original away-from-the-belt direction) by over 180° so as to press the pulley into tensioning engagement with the belt 16 at a "high" position. When sufficient tension is applied to the belt 16, the opposing belt load torque, applied by the belt 16 through the arm 46, will overcome the spring torque applied by the torsion spring 82 to the arm 46, and the arm 46 will start to rotate or pivot in the opposite direction relative to the adjusting member 18 (i.e., in the direction away from the belt 16). At this rotational or angular position of the adjusting member 18 and the arm 46, the torsion spring 82 is adjusted such that it applies the desired, predetermined static tensioning force to the belt 16. In other words, the tensioner 10 will be at its nominal operating position, as illustrated in FIGS. 8C and 9C.

At this point, the fixing bolt 14 is tightened to secure the adjusting member 18 in place. The tensioner 10 has thus been installed with the arm 46 free to pivot about the adjusting member 18 (but limited in its range of rotation by the stops 76 and 78). When the belt 16 slackens during engine operation, the torsion spring 82 forces the arm 46 to rotate, and due to the eccentric configuration, the arm 46 pivots to move the pulley toward the belt to take up belt slack. Conversely, when tension in the belt 16 increases during engine operation, the belt 16 applies a load force to the pulley that causes the arm 46 rotate in the opposite direction, against the biasing force of the torsion spring 82.

The tensioner has now been installed with the appropriate amount of tension in the torsion spring 82 to apply the appropriate amount of torque to the arm 46 to properly tension the belt 16. Because the stop member 74 is pre-fixed, the installation adjustment is made primarily to set the proper static tensioning force on the belt 16, i.e., not to set the position of the stops 76 and 78 relative to the stop member 74. Thus, the installation adjustment need only be made such that the stop member 74 is located somewhere between the stops 76 and 78.

As noted above, the tensioner 10 of the present invention increases the active installation stroke, yet leaves the coupling structure (the pin 34) unloaded for installation and removal. Adding the travel of the arm 46 to the adjusting member stroke increases the overall installation stroke by approximately 50% as compared to the installation stroke of just the adjusting member travel. However, the length of installation stroke needed during belt installation is variable and is adaptable to the engine tolerances and belt length. Thus, it is possible that, for some engine/belt combinations, the additional installation stroke obtained by rotating the arm 46 towards the load stop position is only needed in part or is not even required at all. In those cases, it will not be necessary to rotate the adjusting member 18 and the arm 46 completely (i.e., until the arm 46 reaches the load stop-position), but only until the belt 16 can be routed into the drive system.

Furthermore, because the pin 34 is unloaded (i.e., spring load does not act on the pin 34) except during coupled rotation of the tensioner arm 46 and the adjusting member 18, installing and removing the pin 34 during tensioner assembly is significantly easier. Additionally, the potentially damaging impact of the tensioner arm rotating suddenly all the way to the free arm position as the pin is removed is avoided.

As an alternative configuration, it is contemplated that the pin hole/slot configuration can be reversed. In particular, it is contemplated that the pin hole for the installation pin might be formed in the flange of the eccentric adjusting member and the slot might be formed in the pivot arm, as opposed to vice-versa as described above. That configuration would provide the same lost motion-type of coupling between the pivot arm and the eccentric adjusting member as described above.

It will thus be appreciated that the objectives of the present invention have been fully and effectively accomplished. The foregoing specific embodiments have been provided to illustrate the structural and functional principles of the present invention and is not intended to be limiting. To the contrary, the present invention is intended to encompass all modifications, alterations, and substitutions within the scope of the appended claims.

What is claimed is:

1. A belt tensioner for tensioning a drive belt or timing belt of a belt drive system, said belt tensioner comprising:
   an eccentric adjusting member comprising an inner installation shaft and a surrounding, pivot shaft, said installation shaft having a longitudinal bore configured to receive a fixing bolt to mount said tensioner on an engine mounting surface, said longitudinal bore being offset to a central, longitudinal axis of said pivot shaft, said installation shaft of said eccentric adjusting member being rotatable in a first, belt-tightening direction and a second direction away from the first, belt-tightening direction when mounted on the engine mounting surface;
   a pivot structure mounted on said pivot shaft of said adjusting member for eccentric pivoting movement;
   a belt-tensioning pulley mounted for rotational movement on said pivot structure;
   a biasing member constructed and arranged to resiliently bias said pivot structure in a belt-tightening direction; and
   a temporary coupling structure that temporarily couples said pivot structure to said installation shaft of said eccentric adjusting member such that when said installation shaft of said eccentric adjusting member is rotated in the second direction, away from the first, belt-tightening direction, as part of an installation procedure to allow the drive belt or timing belt to be installed into the belt drive system, said pivot structure moves with said installation shaft of said eccentric adjusting member against the bias of said biasing member, and wherein decoupling of said pivot structure from said installation shaft of said eccentric adjusting member by removal of said coupling structure and securing said eccentric adjusting member in place renders said tensioner operative by enabling said pivot structure to pivot freely and eccentrically about said pivot shaft of said eccentric adjusting member.

2. A belt tensioner according to claim 1, wherein said tensioner is constructed such that said biasing member imparts relatively little or no torsional load to said temporary coupling member until said pivot structure moves with said installation shaft of said eccentric adjusting member during said installation procedure.

3. A belt tensioner according to claim 1, wherein the tensioner is configured such that the belt drive or timing belt can be installed into the belt drive system most easily when said installation shaft of said eccentric adjusting member is at an extreme position away from the belt and said pivot structure is pivoted relative to said installation shaft of said eccentric adjusting member to a position corresponding to maximum load-caused deflection.

4. A belt tensioner according to claim 1, further comprising a base plate, wherein said base plate has a stop member portion, said pivot structure has a stop load and a free arm stop, and engagement of said stop member portion of said base plate with said load stop defines a load stop position of said pivot structure and engagement of said stop member portion with said free arm stop defines a free arm stop position of said pivot structure.

5. A belt tensioner according to claim 1, wherein said biasing member comprises a torsion spring.

6. A belt tensioner according to claim 1, further comprising a base plate, wherein said biasing member is operatively disposed between said base plate and said pivot structure to bias said pivot structure in said belt-tightening direction.

7. A belt tensioner according to claim 6, wherein when said tensioner is installed, said base plate is disposed adjacent the engine mounting surface.

8. A belt tensioner according to claim 1, wherein said temporary coupling structure comprises a removable pin.

9. A belt tensioner according to claim 8, wherein one of said installation shaft of said eccentric adjusting member and said pivot structure has a slot and the other of said installation shaft of said eccentric adjusting member and said pivot structure has a hole and said pin passes through said slot and fits into said hole, said tensioner being configured such that an end of said slot engages said pin to couple said pivot structure with said installation shaft of said adjusting member as said installation shaft of said eccentric adjusting member is rotated in said second direction, away from said belt-tightening direction, during the installation procedure.

10. A belt tensioner according to claim 9, wherein said slot is formed in said installation shaft of said eccentric adjusting member and said hole is formed in said pivot structure.

11. A belt tensioner according to claim 9, wherein said tensioner is constructed such that said biasing member imparts relatively little or no torsional load to said pin until the end of said slot engages said pin to couple said pivot structure to said installation shaft of said eccentric adjusting member, at which point said pivot structure moves with said installation shaft of said eccentric adjusting member during said installation procedure.

12. A belt tensioner for tensioning a drive belt or timing belt of a belt drive system, said belt tensioner comprising:
an eccentric adjusting member comprising an inner installation shaft and a surrounding, pivot shaft, said installation shaft having a longitudinal bore configured to receive a fixing bolt to mount said tensioner on an engine mounting surface, said longitudinal bore being offset to a central, longitudinal axis of said pivot shaft, said installation shaft of said eccentric adjusting member being rotatable in a first, belt-tightening direction and a second direction away from the first, belt-tightening direction when mounted on the engine mounting surface;
a pivot structure mounted on said pivot shaft of said adjusting member for eccentric pivoting movement;
a belt-tensioning pulley mounted for rotational movement on said pivot structure; and
a biasing member constructed and arranged to resiliently bias said pivot structure in a belt-tightening direction;
wherein said tensioner receives a temporary coupling structure that temporarily couples said pivot structure to said installation shaft of said eccentric adjusting member such that when said installation shaft of said eccentric adjusting member is rotated in the second direction, away from the first, belt-tightening direction, as part of an installation procedure to allow the drive belt or timing belt to be installed into the belt drive system, said pivot structure moves with said installation shaft of said eccentric adjusting member against the bias of said biasing member, and wherein removal of said temporary coupling structure decouples said pivot structure from said installation shaft of said eccentric adjusting member and securing of the eccentric adjusting member in place to render said tensioner operative by enabling said pivot structure to pivot freely and eccentrically about said pivot shaft of said eccentric adjusting member.

13. A belt tensioner according to claim 12, wherein said tensioner is constructed such that said biasing member imparts relatively little or no torsional load to said temporary coupling member, when received by said tensioner, until said pivot structure moves with said installation shaft of said eccentric adjusting member during said installation procedure.

14. A belt tensioner according to claim 12, wherein the tensioner is configured such that, with said coupling member received by the tensioner, the drive belt or timing belt can be installed into the belt drive system most easily when said installation shaft of said eccentric adjusting member is at an extreme position away from the belt and said pivot structure is pivoted relative to said installation shaft of said eccentric adjusting member to a position corresponding to maximum load-caused deflection.

15. A belt tensioner according to claim 12, further comprising a base plate, wherein said base plate has a stop member portion, said pivot structure has a load stop and a free arm stop, and engagement of said stop member portion of said base plate with said load stop defines a load stop position of said pivot structure and engagement of said stop member portion with said free arm stop defines a free arm stop position of said pivot structure.

16. A belt tensioner according to claim 12, wherein said biasing member comprises a torsion spring.

17. A belt tensioner according to claim 12, further comprising a base plate, wherein said biasing member is operatively disposed between said base plate and said pivot structure to bias said pivot structure in said belt-tightening direction.

18. A belt tensioner according to claim 17, wherein when said tensioner is installed, said base plate is disposed adjacent the engine mounting surface.

19. A belt tensioner according to claim 12, wherein said temporary coupling structure comprises a removable pin and said tensioner is configured to receive said pin.

20. A belt tensioner according to claim 19, wherein one of said installation shaft of said eccentric adjusting member and said pivot structure has a slot and the other of said installation shaft of said eccentric adjusting member and said pivot structure has a hole and said pin passes through said slot and fits into said hole, said tensioner being configured such that an end of said slot engages said pin to couple said pivot structure with said installation shaft of said adjusting member as said installation shaft of said eccentric adjusting member is rotated in said second direction, away from said belt-tightening direction, during the installation process.

21. A belt tensioner according to claim 20, wherein said slot is formed in said installation shaft of said eccentric adjusting member and said hole is formed in said pivot structure.

22. A belt tensioner according to claim 20, wherein said tensioner is constructed such that said biasing member imparts relatively little or no torsional load to said pin, when received by said tensioner, until the end of said slot engages said pin to couple said pivot structure to said installation shaft of said eccentric adjusting member, at which point said pivot structure moves with said installation shaft of said eccentric adjusting member during said installation procedure.

* * * * *